United States Patent [19]
Shiau et al.

[11] Patent Number: 5,852,678
[45] Date of Patent: Dec. 22, 1998

[54] DETECTION AND RENDERING OF TEXT IN TINTED AREAS

[75] Inventors: Jeng-nan Shiau; Zhigang Fan; Raymond J. Clark, all of Webster, N.Y.

[73] Assignee: Xerox Corporation, Stamford, Conn.

[21] Appl. No.: 655,523

[22] Filed: May 30, 1996

[51] Int. Cl.$^6$ .................................................. G06K 9/34
[52] U.S. Cl. ......................... 382/176; 382/205; 382/264; 358/462
[58] Field of Search ..................................... 382/173, 176, 382/205, 264, 263, 278; 358/458, 462, 464

[56] References Cited

U.S. PATENT DOCUMENTS

| | | | |
|---|---|---|---|
| 4,194,221 | 3/1980 | Stoffel | 358/456 |
| 4,893,188 | 1/1990 | Murakami et al. | 382/176 |
| 5,001,767 | 3/1991 | Yoneda et al. | 382/176 |
| 5,293,430 | 3/1994 | Shiau et al. | 382/173 |

OTHER PUBLICATIONS

W. Pratt, "Digital Image Processing," 2nd Edition, John Wiley & Son, New York 1991, pp. 500–501.

*Primary Examiner*—Phuoc Tran
*Attorney, Agent, or Firm*—Oliff & Berridge, PLC

[57] ABSTRACT

A method and apparatus improves digital reproduction of a compound document image containing half-tone tint regions and text and/or graphics embedded within the half-tone tint regions. The method entails determining a local average pixel value for each pixel in the image, then discriminating and classifying based on the local average pixel values, text/graphics pixels from half-tone tint pixels. Discrimination can be effected by calculating a range of local averages within a neighborhood surrounding each pixel; by calculating edge gradients based on the local average pixel values; or by approximating second derivatives of the local average pixel values based on the local averages. Text/graphics pixels are rendered using a rendering method appropriate for that type of pixel; half-tone tint pixels are rendered using a rendering method appropriate for that type of pixel.

19 Claims, 5 Drawing Sheets

BENCHM

*Health Eduactic*

A recent Gallup poll reveals how stro
health care with employment; the O
would formalize the association. Th
when a company takes an active r
employees listen. At companies with
19% of workers could identify, for in
versus only 11% of workers at com Who should have primary responsibilit
worker about health-related issues? (by Self 35%

FIG.5

DETECTION AND RENDERING OF TEXT IN TINTED AREAS

BACKGROUND OF THE INVENTION

1. Field of the Invention

In general, the invention relates to reproduction of compound images containing both text/graphical information and half-tone tinted regions. In particular, the invention relates to reproduction of images in which text and/or graphical information is embedded within a half-tone tinted region.

2. Description of Related Art

When digitally reproducing (e.g. by means of a digital copier) compound documents containing tinted regions produced by a half-toning process and text and/or graphics embedded within the tinted regions, it is desirable to segment the image into text/graphical portions and tinted, half-toned portions in order to optimize print quality. (Text and/or graphics will be referred to herein simply as "text".) Often, text areas are enhanced and then rendered using thresholding or error diffusion. Low frequency half-toned areas can be reproduced using error diffusion; high frequency half-toned areas may be reproduced using de-screen filtering followed by half-toning using a screen appropriate for the output print device, e.g. the digital copier printer. Methods for doing so are known in the art. See, for example, Stoffel, U.S. Pat. No. 4,194,221 and Shiau et al., U.S. Pat. No. 5,293,430, the disclosures of both of which are incorporated by reference.

Discrimination between, and separation of the image into, areas of text and half-tone tinting is not always a simple proposition. Often, documents contain text embedded within half-tone tint areas. In previous reproduction methods, such embedded text was reproduced in the same manner as the surrounding half-tone tinted region. Hence, it was low-pass filtered and re-screened with the surrounding pixels constituting the half-tone tinting. As a result, the embedded text would have a blurred or "ragged" appearance (FIG. 1).

SUMMARY OF THE INVENTION

The present invention overcomes this problem by detecting text that is embedded within half-tone tint regions and rendering the text and tint regions separately by processes appropriate for each type of pixel. Thus, in a first aspect, the invention provides a method for reproducing a compound document image containing a half-tone tint region with text and/or graphics embedded in the half-tone tint region. In the method, a digital image of the document is provided. The digital image includes a multiplicity of pixels, each of which has a value that represents the tone of the pixel. An "average image" of the document is derived by calculating, for each pixel location, an average of the values of the pixels within an "averaging window" encompassing that pixel location. A "discrimination value" is then determined for each pixel location indicating whether the pixel is a half-tone tint pixel or a text/graphics pixel. This information is then used to control a print device to reproduce at least a portion of the document image.

Embodiments of the inventive method can include the following features. The average image can be calculated using a simple average, or it can be calculated using a weighted average. The averaging window used to calculate the average image can have predetermined dimensions; it can also have variable dimensions which vary based on scanning resolution used to generate the digital image or frequency components of the digital image.

The discrimination value can be based on the average image, either by calculating a range of the average pixel values within a neighborhood surrounding each pixel, by calculating average value edge gradients for each pixel location, or by approximating second derivatives of the average pixel values for each pixel location.

The input digital image can be analyzed for frequency levels in the original half-tone image that is to be reproduced. The print device can be controlled in accordance with the frequency information as well as the discrimination value. The digital image can be de-screen filtered before the portion of the document image is reproduced.

The method allows the embedded text and/or graphics to be "extracted" so that the embedded text and/or graphics can be printed without the half-tone tinting in which it is embedded.

In another aspect, the invention provides an apparatus for digitally reproducing a compound document image containing half-tone tint regions with text and/or graphics embedded in the half-tone tint regions. The apparatus includes an input device that allows a digital image of the document to be input. The digital image includes a multiplicity of pixels, each of which has a value to represent the tone of the pixel. The apparatus has an averaging device which determines an average image of the document by calculating, for each pixel location, an average of pixel values within an averaging window that encompasses that pixel location. The apparatus also has a text detector that determines a discrimination value for each pixel indicating whether that pixel is a half-tone tint pixel or a text/graphics pixel, and a video processor that controls a print device in accordance with said discrimination values to output a reproduction of at least a portion of the document image.

Embodiments of the inventive apparatus can include the following features. The apparatus can be a digital copier, in which case the input device can be a scanner. The apparatus can include a frequency detector which analyzes the image to determine frequency levels for each pixel location. The print device can be controlled in accordance with the frequency information as well as the discrimination value. The apparatus can include a descreening filter which removes screen effects before the print device outputs the reproduction of a portion of the document image.

BRIEF DESCRIPTION OF THE DRAWINGS

FIG. 5 shows an example of text embedded within half-tone tinted areas as rendered according to the invention.

DETAILED DESCRIPTION OF PREFERRED EMBODIMENTS

Figure 2:
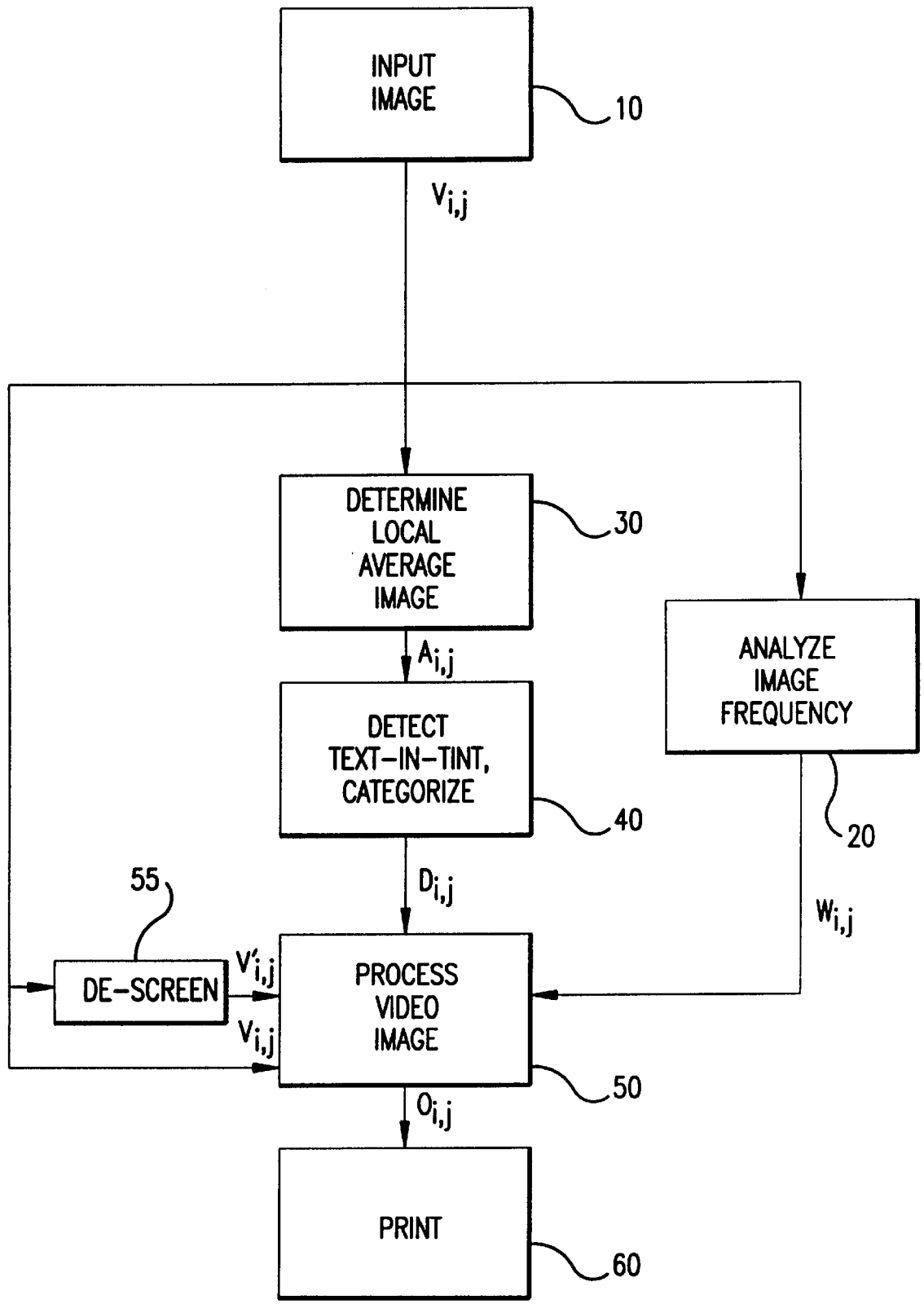
FIG. 2 is a flowchart showing the steps of an embodiment of a digital reproduction method according to the invention.
Figure 3:
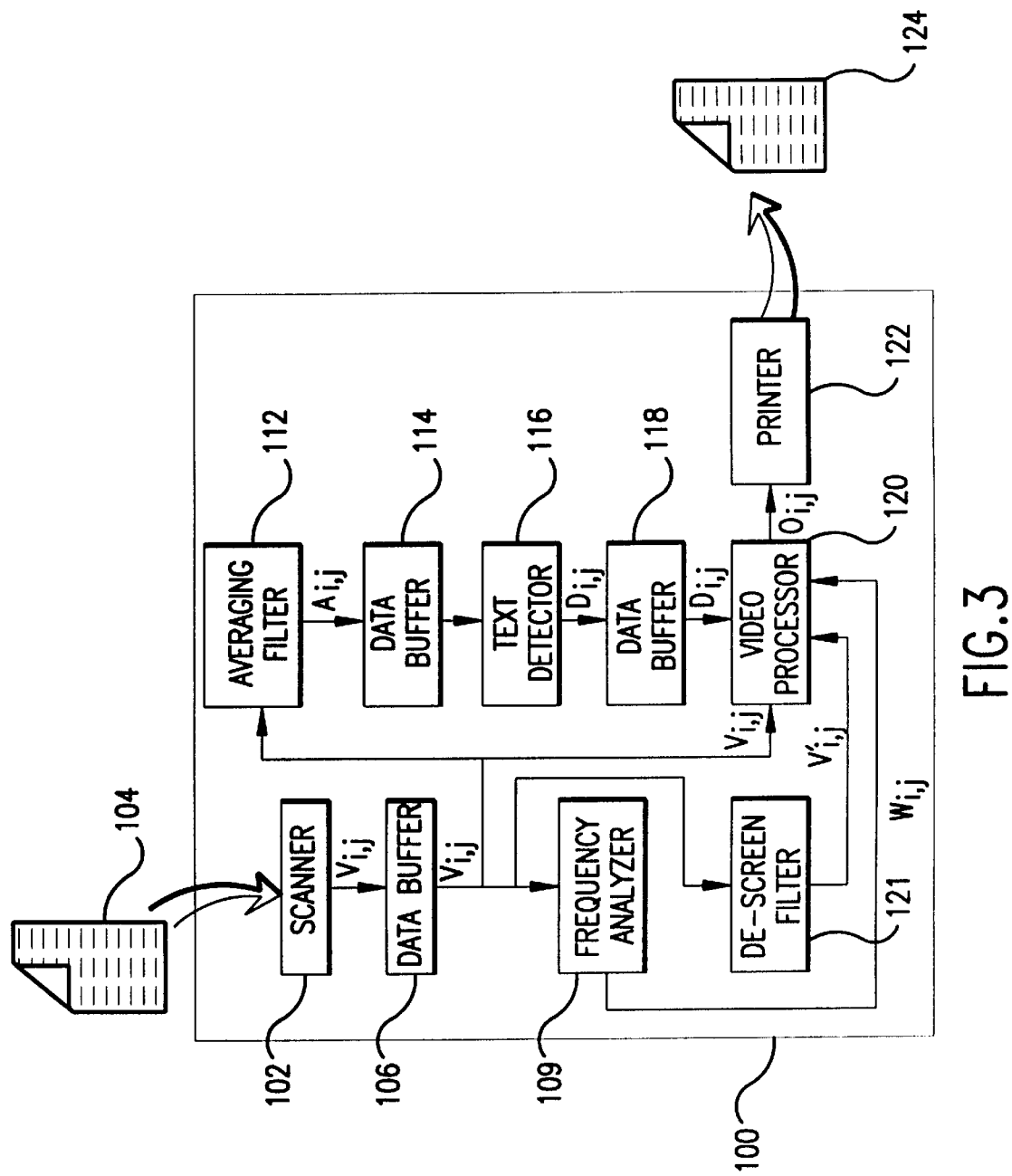
FIG. 3 is a block diagrammatic representation of a reproducing apparatus which performs the method shown in FIG. 2.

As shown in FIG. 2, image reproduction according to the invention begins with input 10 of a digital representation of an image. The digital representation includes a multiplicity of pixels, and the value of each pixel indicates the tone of the pixel. In an eight-bit representation, for example, a pixel value of 255 typically indicates a totally white pixel, and a pixel value of zero indicates a totally black pixel. As shown in FIG. 3, digital copier 100 includes a scanner 102 which scans a document 104 having text and tinted regions and outputs a digitized representation $V_{i,j}$ of the document image. $V_{i,j}$ may be stored in data buffer 106.

The image data $V_{i,j}$ is analyzed, in frequency analysis step 20, using frequency analyzer 109. Frequency analyzer 109, as is known in the art (e.g. Stoffel or Shiau et al., cited above), analyzes image data and determines whether it is continuous tone, low frequency half-tone, or high frequency half-tone image data. Frequency analyzer 109 outputs frequency information $\omega_{i,j}$ for every pixel indicating whether the pixel is located in a region of low frequency half-tone tinting or high frequency half-tone tinting.

The image data $V_{i,j}$ from buffer 106 is also processed by an averaging filter 112 which implements an averaging process 30 (FIG. 2) to produce an average image $A_{i,j}$. The average image $A_{i,j}$ consists of a local average value, for every pixel location, of the pixel values for that pixel location and the surrounding pixel locations. In other words, the local average value is obtained by averaging the pixel values within a local averaging window surrounding each pixel in the image. The averaging process 30 (FIG. 2) effected by the averaging filter 112 (FIG. 3) can be represented mathematically as a convolution:

$$A_{i,j} = \Sigma C_{i,j} \times V_{i,j} \quad (1)$$

where $C_{i,j}$ are the filter coefficients.

Figure 4A:
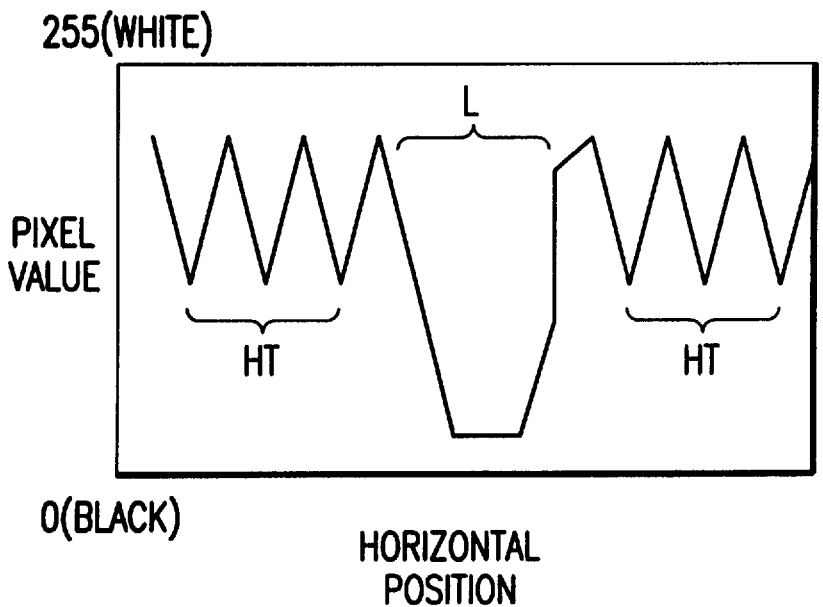
FIGS. 4A and 4B are graphs showing variation of pixel values, in the horizontal direction, for a vertical line embedded in a half-tone tinted region before and after averaging, respectively.
Figure 4B:
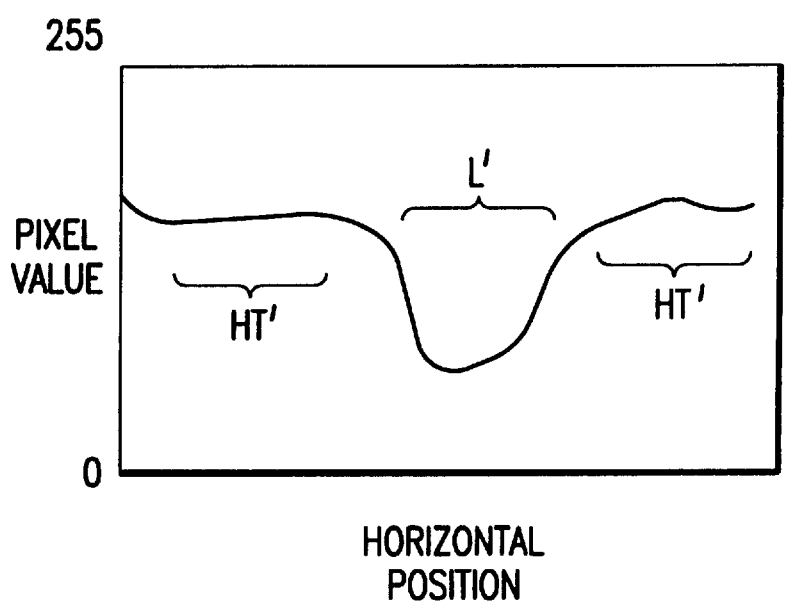

The averaging process "smoothes out" variations in the pixel values in the half-tone tint areas, but leaves distinct variations where text exists, even when the text is embedded within a half-tone tinted region. For example, FIG. 4A represents the variation, in the horizontal direction, of the pixel values in the neighborhood of a vertical line embedded within a half-tone tinted region. The half-tone tinted regions are represented by the portions labelled HT; the vertical line is represented by the portion labelled L. As shown in FIG. 4B, the half-toned regions are smoothed out to nearly uniform values, as shown in the regions labelled HT', while the region L' corresponding to the vertical line still shows a significant change in the local pixel value. In one implementation of the invention, the size of the averaging window can be predetermined. Alternatively, it is preferable for the size of the averaging window to vary based on the horizontal and vertical frequency components of the input video signal $V_{i,j}$. At a minimum, the averaging window must be as large, in each of the horizontal or vertical directions, as the "wavelength" of the image in the corresponding direction, i.e. the number of pixels over which the periodic components of the image repeats themselves. If the averaging window is too large, however, the possibility exists for the local average value for a text pixel to be excessively biased by surrounding half-tone tint pixels so that it appears as if no text pixel is present at all. Moreover, a larger averaging window is more costly to implement in terms of required computing power and memory and actual cost.

For a common scanning resolution of 400 spots per inch (spi), an averaging window size of 3 pixels×3 pixels could be used. An averaging window of this size is able to smooth out 45 degree half-tone tinting at 120 lines per inch (lpi) or higher frequency, without obliterating the existence of embedded text. For 600 spi scanning resolution, the averaging window could be expanded to 5 pixels×5 pixels. For a scanning resolution of 400 spi in the horizontal direction and 600 spi in the vertical direction, with a 45 degree half-tone frequency of 120 lpi or more, an averaging window of 3 pixels horizontally×5 pixels vertically would be appropriate.

The manner in which the pixel values within the averaging window are averaged can also vary. In one implementation, the local average value can be a simple average. In that case, using the 3 pixel by 5 pixel averaging window as an example, the filter coefficients $C_{i,j}$ could be expressed as follows:

$$C_{i,j} = \frac{1}{15} \times \begin{bmatrix} 1 & 1 & 1 \\ 1 & 1 & 1 \\ 1 & 1 & 1 \\ 1 & 1 & 1 \\ 1 & 1 & 1 \end{bmatrix} \quad (2)$$

Alternatively, it is possible to use a weighted average filtering method. A preferred coefficient set which yields better averaging results is $$C = \frac{1}{256} \times \begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix} \quad (3)$$

This filter can be implemented conveniently by first convolving $V_{i,j}$ with a 4 pixel×4 pixel filter with unity coefficients, then convolving the output of that filter using the same 4 pixel×4 pixel filter.

The output $A_{i,j}$ of the averaging filter 112 can be stored in data buffer 114 (FIG. 3).

Next, the average image $A_{i,j}$ is processed by text detector 116 (FIG. 3) where text and low frequency half-tone tinting are discriminated from high frequency half-tone tinting in step 40 (FIG. 2). The text detector 116 can discriminate between text and half-tone tinting by several different methods. In one method, a range of average pixel values is determined, for each pixel location, by subtracting the minimum local average pixel value from the maximum local pixel value in a "range neighborhood" surrounding the pixel. A range value $R_{i,j}$ is calculated at each pixel location and compared with a suitable predetermined threshold value $T_1$. If the local range value exceeds the threshold value, which indicates that there is significant variation in the local average pixel values in the neighborhood of the pixel of interest, then a discrimination value $D_{i,j}$ is set to 1 to indicate the presence of a text pixel; otherwise, $D_{i,j}$ is set to 0 to indicate that the pixel is located in a half-tone tint region, i.e. a region where there is little variation in the local average pixel values.

With regard to the size of the neighborhood over which the range value $R_{i,j}$ is determined, a simple 3 pixel×3 pixel neighborhood has been found to work well. Other neighborhood configurations are, however, possible. For example, the neighborhood for determining the range of the local average pixel values could consist of the pixel of interest and the four neighboring pixels in the vertical and horizontal directions; alternatively, it could consist of the pixel of interest and the four neighboring pixels in the diagonal directions. A larger range neighborhood could, of course, be used. If too large of a neighborhood is used, however, the determination as to whether a given pixel is a text pixel or a half-tone pixel will be influenced improperly by pixels that are too far removed from the given pixel to be relevant. Moreover, computing time and cost will increase.

With regard to the threshold $T_1$, a value of 40 has been determined empirically to work well for an 8-bit representation scheme where 0 indicates that a pixel is completely black and 255 indicates that a pixel is completely white. The actual threshold value can, of course, vary depending on the particular parameters of the processing apparatus being used. It should be kept in mind, however, that if the threshold value is set too high, text pixels will not be detected by the text detector 116; if the threshold value is set too low, all half-tone pixels will improperly be classified as text pixels.

Alternatively, a second detection method applies edge detection filters to the average image $A_{i,j}$. For example, one could use a Sobel edge detector (see, for example, Pratt, "Digital Image Processing," 2nd Edition, John Wiley & Son, New York, 1991, p. 501). In that case, one would compute the horizontal and vertical edge gradients as follows:

$$G_H = \tfrac{1}{4} \times [(A_{i-1,j+1} + 2A_{i,j+1} + A_{i+1,j+1}) - (A_{i-1,j-1} + 2A_{i,j-1} + A_{i+1,j-1})] \quad (4)$$

$$G_V = \tfrac{1}{4} \times [(A_{i+1,j+1} + 2A_{i+1,j} + A_{i+1,j-1}) - (A_{i-1,j+1} + 2A_{i-1,j} + A_{i-1,j-1})] \quad (5)$$

If the sum of the absolute values of the two gradients exceeds a predetermined threshold $T_2$, then the pixel is classified as a text pixel and the local discrimination value $D_{i,j}$ is set to 1; otherwise, $D_{i,j}$ is set to 0 to indicate a half-tone pixel.

As a third alternative, text or lines within half-tone tinted regions can be detected even more accurately by calculating approximations of the horizontal and vertical second derivatives of the local average pixel values as follows:

$$L_H = \tfrac{1}{4}[A_{i-1,j+1} + 2A_{i,j+1} + A_{i+1,j+1}) + (A_{i-1,j-1} + 2A_{i,j-1} + A_{i+1,j-1}) - 4A_{i,j}] \quad (6)$$

$$L_V = \tfrac{1}{4} \times [(A_{i+1,j+1} + 2A_{i+1,j} + A_{i+1,j-1}) + (A_{i-1,j+1} + 2A_{i-1,j} + A_{i-1,j-1}) - 4A_{i,j}] \quad (7)$$

If either $L_H$ or $L_V$ exceeds a predetermined threshold $T_3$, then the discrimination value $D_{i,j}$ is set to 1 to indicate a text pixel; otherwise it is set to 0. This detection scheme is useful in detecting "ridges" in lines, e.g. local maxima or minima in horizontally oriented lines or "elbows" in vertically oriented lines.

The discrimination values $D_{i,j}$ can be stored in data buffer 118.

Video processor 120 (FIG. 3) then processes either the video image data $V_{i,j}$ or de-screened image data $V'_{i,j}$ in processing step 50 (FIG. 2) based on the discrimination values $D_{i,j}$ and the frequency information $\omega_{i,j}$. Descreening, which is implemented by filter 121 (FIG. 3) according to methods known in the art (e.g. Shiau et al. or Stoffel, cited above) is necessary in order to prevent moire patterns which can result when an image already containing screen effects is screened again. Pixels for which the discrimination value $D_{i,j}$ is 0 are high frequency half-tone tint pixels, and they are rendered as such by re-screening the de-screened image $V'_{i,j}$ using a screen appropriate for the printer 122.

Pixels for which the discrimination value $D_{i,j}$ is 1, on the other hand, are only presumptively text pixels. This is because the text detector 116 tends to produce a positive response ($D_{i,j}=1$) for pixels located in low frequency half-tone areas when the averaging process uses a small averaging window and does not adequately smooth out the half-tone region. The frequency analyzer 109 is, however, sufficiently able to distinguish between high frequency and low frequency half-tone regions. Therefore, the video processor 120 processes the image data based not only on the discrimination signal $D_{i,j}$, but also in conjunction with the frequency information $\omega_{i,j}$ that is output by the frequency detector 109. Thus, if the discrimination value $D_{i,j}$ is 1 and the frequency information $\omega_{i,j}$ indicates that a pixel is in a high frequency half-tone region, the pixel can be rendered as if it is a text pixel. In that case, the originally input video image data $V_{i,j}$ is processed using a thresholding or error diffusion technique.

Figure 1:
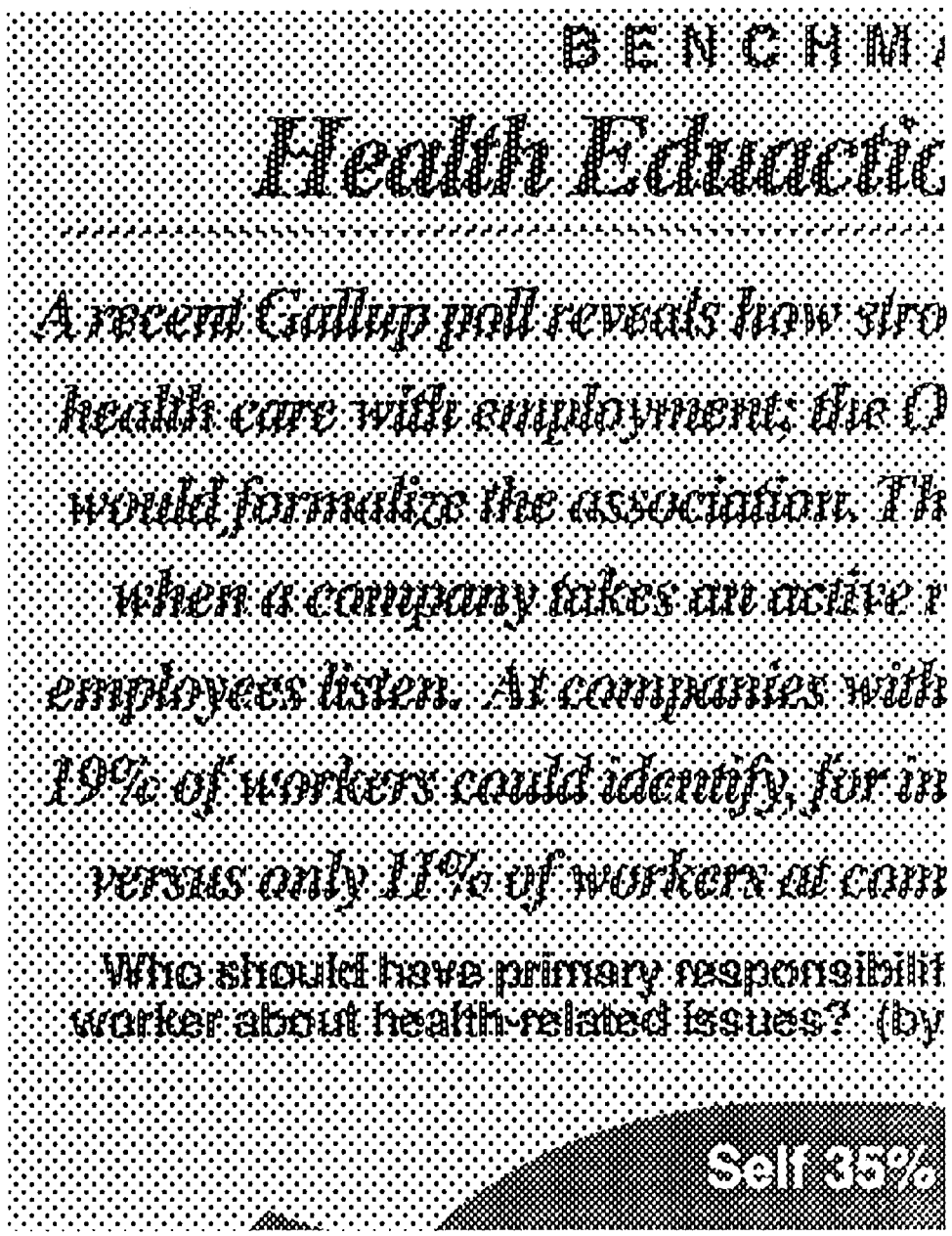
FIG. 1 shows an example of text embedded within half-tone tinted areas as rendered by a prior art reproduction method.

Finally, the output $O_{i,j}$ of the video processor controls printer 122 which prints the output copy 124 (FIG. 3) in print step 60 (FIG. 2). Because the text pixels are rendered by a method that is most appropriate for text, while the half-tone tint pixels are rendered by a method most appropriate for those types of pixels, the overall appearance of the reproduced compound image (FIG. 5) is significantly sharper than the appearance of the image produced without discriminating between half-tone tint pixels and text pixels embedded therein (FIG. 1).

While this invention has been described in conjunction with specific embodiments thereof, it is evident that many alternatives, modifications, and variations will be apparent to those skilled in the art. For example, although the invention is described in the context of a digital copier, the method of the invention could be carried out on a personal computer using image data that is received from some auxiliary source and a computer printer. Moreover, although in the copying context the entire document image is customarily printed, the method of the invention could be used to "extract" and print just the text portions of the document. Accordingly, the preferred embodiments of the invention as set forth herein are intended to be illustrative and not limiting. Various changes may be made without departing from the spirit and scope of the invention as defined in the following claims.

What is claimed is:

1. A method for reproducing a compound document image comprising:

distinguishing half-tone tint regions having embedded text and/or line graphics from half-tone tint regions not having embedded text and/or line graphics;

providing a digital image of said document, said digital image comprising a multiplicity of pixels, each of which has a value to represent the tonal state of said pixel;

determining an average image of said document by calculating, for each said pixel, an average of the values of the pixels within an averaging window encompassing said pixel;

determining a discrimination value for each said pixel indicating whether said pixel is a half-tone tint pixel or a text/graphics pixel; and controlling a print device in accordance with said discrimination values to output a reproduction of at least a portion of said document image.

2. The method of claim 1, wherein said determining an average image comprises calculating for each said pixel a simple average of the values of the pixels within an averaging window encompassing said pixel.

3. The method of claim 1, wherein said determining an average image comprises calculating for each said pixel a weighted average of the values of the pixels within an averaging window encompassing said pixel.

4. The method of claim 1, wherein said averaging window has predetermined dimensions.

5. The method of claim 1, wherein said averaging window has variable dimensions and said method further comprises determining said dimensions based on a scanning resolution used to generate said compound document image.

6. The method of claim 1, wherein said averaging window has variable dimensions and said method further comprises determining said dimensions based on a frequency component of said half-tone tint region.

7. The method of claim 1, wherein said determining a discrimination value for each said pixel comprises determining a discrimination value based on said average image.

8. The method of claim 7, further comprising determining a range value for each said pixel by calculating a range of the average values of the pixels in a neighborhood encompassing said pixel; and wherein said determining a discrimination value for each said pixel comprises determining whether said pixel is a half-tone tint pixel or a text/graphics pixel based on said range value.

9. The method of claim 7, further comprising determining a gradient value for each said pixel by calculating a horizontal and a vertical edge gradient based on said average image; and wherein said determining a discrimination value for each said pixel comprises determining whether said pixel is a half-tone tint pixel or a text/graphics pixel based on said gradient value.

10. The method of claim 7, further comprising determining a second derivative value for each said pixel by calculating an approximation to a horizontal and a vertical second derivative of the local averages of said pixels; and wherein said determining a discrimination value comprises determining for each said pixel whether said pixel is a half-tone tint pixel or a text/graphics pixel based on said derivative value.

11. The method of claim 1, further comprising analyzing said digital image to determine, for each said pixel, whether said pixel is in a high frequency half-tone tint region or a low frequency half-tone tint region.

12. The method of claim 11, further comprising controlling said print device in accordance with said determination as to whether each said pixel is in a high frequency half-tone tint region or a low frequency half-tone tint region to output a reproduction of at least a portion of said document image.

13. The method of claim 12, further comprising de-screen filtering said digital image before outputting said reproduction of at least a portion of said document image.

14. The method of claim 1, wherein said portion consists of the embedded text and/or graphics and wherein said outputting comprises printing said embedded text and/or graphics without printing the half-tone tint region in which said text and/or graphics is embedded.

15. An apparatus for digitally reproducing a compound document image comprising:

a device for distinguishing half-tone tint regions having embedded text and/or line graphics from half-tone tint regions not having embedded text and/or line gragphics;

an input device configured to provide a digital image of said document, said digital image comprising a multiplicity of pixels, each of which has a value to represent the tonal state of said pixel;

an averaging device which determines an average image of said document by calculating, for each said pixel, an average of the values of the pixels within an averaging window encompassing said pixel;

a text detector which determines a discrimination value for each said pixel indicating whether said pixel is a half-tone tint pixel or a text/graphics pixel; and video processor which controls a print device in accordance with said discrimination values to output a reproduction of at least a portion of said document image.

16. The apparatus of claim 15, further comprising a frequency detector which analyzes said digital image to determine for each said pixel whether said pixel is in a high frequency half-tone tint region or a low frequency half-tone tint region, and wherein said video processor further controls said print device in accordance with said determination as to whether each said pixel is in a high frequency half-tone tint region or a low frequency half-tone tint region to output a reproduction of at least a portion of said document image.

17. The apparatus of claim 16, further comprising a de-screening filter which removes screen effects from said digital image before said print device outputs said reproduction of at least a portion of said document image.

18. The apparatus of claim 15 wherein said input device comprises a scanner.

19. The apparatus of claim 15 wherein said apparatus is a digital copier.

* * * * *